US008980388B2

(12) United States Patent
Sisler et al.

(10) Patent No.: US 8,980,388 B2
(45) Date of Patent: Mar. 17, 2015

(54) USE OF SILANE PROMOTER TO MODIFY PRESSURE SENSITIVE ADHESIVE FOR USE IN PRESSURE SEAL MAILERS PRINTED ON IGEN3

(75) Inventors: Gordon Sisler, St. Catharines (CA); Guiqin Song, Milton (CA); T. Brian McAneney, Burlington (CA); John Viavattine, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 677 days.

(21) Appl. No.: 12/016,524

(22) Filed: Jan. 18, 2008

(65) Prior Publication Data

US 2009/0184157 A1 Jul. 23, 2009

(51) Int. Cl.
*B32B 1/02* (2006.01)
*C09J 11/06* (2006.01)
*C09J 7/04* (2006.01)
*B42D 15/08* (2006.01)
*B32B 1/08* (2006.01)

(52) U.S. Cl.
CPC *C09J 11/06* (2013.01); *C09J 7/045* (2013.01); *B42D 15/08* (2013.01); *C09J 2201/28* (2013.01); *C09J 2400/283* (2013.01)
USPC ....... 428/34.2; 428/34.1; 428/35.7; 428/35.9; 428/36.9

(58) Field of Classification Search
USPC ...................... 428/34.1, 35.7, 35.9, 36.9, 34.2
See application file for complete search history.

(56) References Cited

U.S. PATENT DOCUMENTS

| 4,029,627 A | 6/1977 | Imperial et al. |
| 4,101,686 A | 7/1978 | Strella et al. |
| 4,185,140 A | 1/1980 | Hoffend et al. |
| 4,906,695 A * | 3/1990 | Blizzard et al. ............... 525/100 |
| 4,918,128 A | 4/1990 | Sakai |
| 5,157,445 A | 10/1992 | Shoji et al. |
| 5,427,851 A * | 6/1995 | Mehta ........................... 428/356 |

(Continued)

FOREIGN PATENT DOCUMENTS

| EP | 0 982 359 | 3/2000 |
| JP | 8-048956 | 2/1996 |

(Continued)

OTHER PUBLICATIONS

U.S. Appl. No. 11/623,640, filed Jan. 16, 2007, entitled "Adhesion Promoter".

(Continued)

*Primary Examiner* — Marc Patterson
(74) *Attorney, Agent, or Firm* — MH2 Technology Law Group LLP (57) ABSTRACT

Exemplary embodiments provide a pressure-seal cohesive and method for making and using the pressure-seal cohesive to form mailer type business forms. The disclosed pressure-seal cohesive can provide an improved cohesive sealing of the mailer forms. In particular, the pressure-seal cohesive can include at least one silane promoter admixed with at least one aqueous pressure sensitive compound formulation that contains pressure sensitive cohesive and/or adhesive compounds. The admixed silane promoter can have a concentration ranging from about 0.5% to about 2.5% weight percent of the pressure-seal cohesive to improve the compatibility of the pressure sensitive compounds, even if they are contaminated by the fuser oils (e.g., functionalized PDMS oil) during digital printing processes (e.g., on Xerox iGen3).

11 Claims, 3 Drawing Sheets

(56) References Cited

U.S. PATENT DOCUMENTS

| | | |
|---|---|---|
| 5,512,409 A | 4/1996 | Henry et al. |
| 5,516,361 A | 5/1996 | Chow et al. |
| 5,531,813 A | 7/1996 | Henry et al. |
| 5,716,747 A | 2/1998 | Uneme et al. |
| 5,747,212 A | 5/1998 | Kaplan et al. |
| 6,183,929 B1 | 2/2001 | Chow et al. |
| 6,207,257 B1 | 3/2001 | Cummings |
| 6,277,481 B1 * | 8/2001 | Sugino et al. ............. 428/317.1 |
| 6,335,412 B1 * | 1/2002 | Okamoto et al. ............. 528/18 |
| 6,383,653 B1 | 5/2002 | Vaidya |
| 6,552,118 B2 * | 4/2003 | Fujita et al. ............. 524/588 |
| 6,601,756 B2 * | 8/2003 | Hill et al. ............. 229/92.1 |
| 6,602,944 B2 | 8/2003 | Vaidya |
| 7,973,103 B2 * | 7/2011 | Jin et al. ............. 524/356 |
| 2002/0006990 A1 | 1/2002 | Vaidya |
| 2003/0105261 A1 * | 6/2003 | Komitsu et al. ............. 528/10 |
| 2006/0008727 A1 * | 1/2006 | Gervasi et al. ............. 430/124 |
| 2006/0047061 A1 * | 3/2006 | Van Es et al. ............. 524/556 |

FOREIGN PATENT DOCUMENTS

| | | |
|---|---|---|
| JP | 8-110719 | 4/1996 |
| JP | 2003-524058 | 8/2003 |
| JP | 2006015508 | 1/2006 |
| WO | 01/62866 | 8/2001 |

OTHER PUBLICATIONS

European Search Report dated Jul. 17, 2014 from European Patent Application No. 09150158.5, pp. 1-4.

* cited by examiner

USE OF SILANE PROMOTER TO MODIFY PRESSURE SENSITIVE ADHESIVE FOR USE IN PRESSURE SEAL MAILERS PRINTED ON IGEN3

FIELD OF THE INVENTION

This invention relates generally to pressure sensitive materials and, more particularly, to pressure seal cohesives used in mailer type business forms.

BACKGROUND OF THE INVENTION

Self-mailer forms (e.g., for check stock) are in general well-known. With such forms persons may print (or type) a message then fold and seal the form into a mail piece suitable for mailing. These mailers have been produced from continuous webs of stock and are intended for use on the high speed printers of main frame computers. For example, custom self-mailers represent an important piece of business stationary, which may include laser bond stocks designed to fold and seal in a specific configuration.

In the design of self-mailers, a pressure sensitive adhesive can be coated in strips which are placed to contact each other during sealing. Prior to the sealing operation, the self-mailers can be printed on printing machines, where a toner image can be fixed or fused upon a support (e.g., a plain paper sheet) using a fuser roll. In order to ensure and maintain good release properties of the fuser roll, it has become customary to apply release agents/fuser oils to the fuser roll during the fusing operation. Typically, these release agents/fuser oils are applied as thin films of nonfunctional or functional silicone oils to prevent toner offset.

A variety of silicone oils have been used in the prior art. For example, U.S. Pat. No. 4,029,827 discloses the use of polyorganosiloxanes having mercapto functionality as release agents. U.S. Pat. No. 4,101,686 and U.S. Pat. No. 4,185,140 disclose polymeric release agents having functional groups such as carboxy, hydroxy, epoxy, amino, isocyanate, thioether, or mercapto groups. U.S. Pat. No. 5,157,445 discloses toner release oil having a functional organopolysiloxane. U.S. Pat. No. 5,512,409 teaches a method of fusing thermoplastic resin toner images to a substrate using amino functional silicone oil over a hydrofluoroelastomer fuser member. U.S. Pat. No. 5,516,361 teaches a fusing member having a thermally stable hydrofluoroelastomer surface and having a polyorgano T-type amino functional oil release agents. The oil has predominantly monoamino functionality per active molecule to interact with the hydrofluoroelastomer surface. U.S. Pat. No. 5,531,813 discloses a polyorgano amino functional oil release agent having at least 85% monoamino functionality per active molecule to interact with the thermally stable hydrofluoroelastomer surface of the fuser member. U.S. Pat. No. 5,716,747 discloses the use of fluorine-containing silicone oils for use on fixing rollers with outermost layers of ethylene tetrafluoride perfluoro alkoxyethylene copolymer, polytetrafluoroethylene and polyfluoroethylenepropylene copolymer. U.S. Pat. No. 5,747,212 discloses an amino functional oil. U.S. Pat. No. 6,183,929 discloses a release agent comprising an organosiloxane polymer containing amino-substituted or mercapto-substituted organosiloxane polymers and a nonfunctional organosiloxane polymer. U.S. Pat. No. 4,029,827 describes the use of polymeric release agents having functional groups, which interact with a fuser member to form a thermally stable, renewable self-cleaning layer having good release properties for electroscopic thermoplastic resin toners.

Problems arise, however, due to the formation of a thin film of release agents/fuser oils on the pressure sensitive strips during the fusing operation, which may contaminate the strips and lead to a sealing failure thereafter. This problem is familiar to the industry and some solutions are disclosed in the prior art, such as in U.S. Pat. No. 4,918,128, U.S. Pat. No. 5,427,851, U.S. Pat. No. 6,383,653, and U.S. Pat. No. 6,602,944. These conventional solutions include the development of fuser roll materials and silicone release oils, as well as the demands of color and higher speed printing. The conventional solutions, however, continue to make it difficult for pressure seal mailers to perform adequately after contamination by fuser oils. For example, this is particularly the case for digital color production printers employing functionalized polydimethylsiloxane (PDMS) release oils where the functional group is mercapto or amino. Specifically, there are three basic problems associated with fuser oils. Firstly, the cohesive material softens in the fusing nip offsetting and contaminating the printer; secondly, the release oil interferes with the ability to form a cohesive bond; thirdly, the continued presence of the release oil on the cohesive results in blocking on stacked sheets.

Thus, there is a need to overcome these and other problems of the prior art and to provide a pressure-seal cohesive for use in mailers type business forms even when functionalized PDMS oils are used for fusing operation.

SUMMARY OF THE INVENTION

According to various embodiments, the present teachings include a mailer type business form. The mailer type business form can include a mailer form and a plurality of patterns of pressure-seal cohesive disposed on the mailer form for cohesively sealing the mailer form. The pressure-seal cohesive can further include a silane promoter incorporated with at least one pressure sensitive compound in an aqueous emulsion.

According to various embodiments, the present teachings also include a method of making a mailer type business form. The mailer type business form can be made by first applying a pressure-seal cohesive as a plurality of cooperating patterns onto at least one substrate. The applied pressure-seal cohesive can include a silane promoter and an aqueous pressure sensitive compound formulation that contains one or more pressure sensitive compounds. The mailer type business form can then be formed by drying the plurality of cooperating patterns on the at least one substrate; printing data on the at least one substrate; and applying a thin film of fuser oil on the plurality of cooperating patterns.

According to various embodiments, the present teachings further include a method of making a mailer type business form. The mailer type business form can be made by first mixing a silane promoter with an aqueous pressure sensitive compound emulsion to form a pressure-seal cohesive. The silane promoter can be aminoethyl aminopropymethyldimethoxy-silane. The formed pressure-seal cohesive can be coated onto at least one paper sheet as a plurality of coordinating patterns. The at least one coated paper sheet can then be passed through a fuser for a digital printing, wherein the fuser contains amino-polydimethylsiloxane (PDMS) fuser oil.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

DESCRIPTION OF THE EMBODIMENTS

Reference will now be made in detail to the present embodiments (exemplary embodiments) of the invention, an example of which is illustrated in the accompanying drawings. Wherever possible, the same reference numbers will be used throughout the drawings to refer to the same or like parts. In the following description, reference is made to the accompanying drawings that form a part thereof and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

While the invention has been illustrated with respect to one or more implementations, alterations and/or modifications can be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. The term "at least one of" is used to mean one or more of the listed items can be selected.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less that 10" can assume negative values, e.g. −1, −2, −3, −10, −20, −30, etc.

Exemplary embodiments provide a pressure-seal cohesive and method for making and using the pressure-seal cohesive to form mailer type business forms. The disclosed pressure-seal cohesive can provide an improved cohesive sealing of the mailer forms. In particular, the pressure-seal cohesive can include at least one silane promoter admixed with at least one aqueous pressure sensitive compound formulation that contains, for example, pressure sensitive cohesive and/or adhesive compounds. The admixed silane promoter can have a concentration ranging from about 0.5% to about 2.5% weight percent of the pressure-seal cohesive to improve the compatibility of the pressure sensitive compounds, even if they are contaminated by the fuser oils (e.g., functionalized PDMS oil) during digital printing processes (e.g., on Xerox iGen3).

As disclosed herein unless otherwise specified, the term "pressure-seal cohesive" or "cohesive" refers to a system where the pressure sensitive cohesive material bonds cohesively against itself by applying pressure. As in the case for pressure-seal mailers, the cohesive bond is achieved through the deployment of coordinated strips of pressure-seal cohesive material that includes one or more pressure sensitive compounds and one or more silane promoters, and specific folding patterns. In an exemplary embodiment, the pressure-seal cohesive can be designed to form a cohesive bond (e.g., sealing in a form of strip to strip) using pressures on the order of 100 lbs/lineal inch or higher at ambient temperatures and hold properly at ambient temperatures. It is discovered that the disclosed pressure-seal cohesive can be used as release cohesive after the fusing operations, such as after the xerographic or dry toner fusing systems, even when an expanded class of silicone fuser oils is applied.

As disclosed herein unless otherwise specified, the term "silane promoter" refers to an adhesion/cohesion promoter that contains one or more silane compounds, and is mixed with at least one pressure sensitive compound to improve its adhesive/cohesive properties such as cohesive properties. For example, the resulting pressure-seal cohesive that includes the silane promoter(s) and the pressure sensitive compound (s) can provide cohesive properties for the self-mailers after they run through the fuser (e.g., iGen3 fuser) in a printing process and are contaminated by the fuser oils.

In an exemplary embodiment, the "silane promoter" can be a cohesion promoter including a mixture of, for example, from about 1 to about 5 silane compounds, such as from about 1 to 3 silane compounds. The silane compounds can include, for example, an alkyloxysilane compound, a glycidoxy silane compound or other silane compound. Further examples for the "silane promoter" can include organic silane compounds having at least one silane group represented by the following formula:

Wherein R can be a $C_1$-$C_{30}$ hydrocarbyl including an alkyl, an aryl, a vinyl and the like, wherein the hydrocarbyl can further contain a halogen, nitrogen, oxygen or sulfur atom. Illustrative examples of R can include methyl, ethyl, propyl, octyl, phenyl, methacryloxypropyl, aminopropyl, aminoethylaminopropyl, phenylaminopropyl, chloropropyl, mercaptopropyl, acryloxypropyl, 3-glycidoxypropyl, trifluoropropyl, heptadecafluorodecyl, and isocyanatopropyl group and the like. X can represent a hydrolyzable functional group, a $C_1$-$C_{20}$ alkoxy group, a hydroxy group, a carboxylate group, an arylalkyloxy group, and an aryloxy group, a halogen or a hydrogen atom, and m can be an integer of 1, 2 or 3.

In various embodiments, R can be a non-hydrolyzable organic group, X can be a hydrolytic group and m can be an integer of 1, 2 or 3. X can include a halide, a carboxyl group, an alkoxyl group, an arylalkyloxy group and an aryloxy group. In various embodiments, the hydrolytic silane compound can contain in total two of the hydrolytic X group.

Examples of silane compounds suitable for use herein can include aminoalkylsilane, mercaptoalkylsilane and mixtures thereof, for example, 4-aminobutyltriethoxysilane, 1-amino-2-(dimethylethoxysilyl)propane, N-(2-aminoethyl)-3-aminoisobutyldimethylmethoxysilane, N-(2-aminoethyl)-3-aminoisobutyldimethylmethoxysilane, (aminoethylaminomethyl)phenethyltrimethoxysilane, N-(2-aminoethyl)-3-aminopropylmethyldimethoxysilane, N-(2-aminoethyl)-3-aminopropylsilanetriol, N-(2-aminoethyl)-3-aminopropyltriethoxysilane, N-(2-aminoethyl)-3-aminopropyltrimethoxysilane, N-aminoethyl-AZA-2,2,4-trimethylsilacyclopentane, N-(6-aminohexyl)aminomethyltrimethoxysilane, N-(6-aminohexyl)aminopropyltrimethoxysilane, N-(2-aminoethyl)-11-aminoundecyltrimethoxysilane, 3-aminopropylmethylbis(trimethylsiloxy)silane, 3-aminopropyldimethylethoxysilane, 3-aminopropyltrimethoxysilane, 3-aminopropyltris(methoxyethoxyethoxy)silane, 3-(triethoxysilyl)propylsuccinic anhydride, tris(3-trimethoxysilyipropyl)iso-cyanurate, (3-trimethoxysilylpropyl)diethylene-triamine, methyltrichlorosilane, dimethyldichlorosilane, methyltriethoxysilane, ethyltrichlorosilane, ethyltrimethoxysilane, dimethyldimethoxysilane, methyltriethoxysilane, ethyltriethoxysilane, propyltrimethoxysilane, amino silane hydrochloride, 3-glycidoxypropyl trimethoxysilane (Z-6040, available from Dow Corning; KBM 403, available from Shin-Etsu), methyltrimethoxysilane (Z-6070, available from Dow Corning; KBM 13, available from Shin-Etsu), methacryloxypropyltrimethoxysilane (Z-6030, available from Dow Corning; KBM502, available from Shin-Etsu), aminopropyltrimethoxysilane (Z-6011, available from Dow Corning; KBM903, available from Shin-Etsu), aminoethylaminopropyltrimethoxysilane (KBM603, available from Shin-Etsu or DOW Z 6032, available from Dow Corning; KBM603, available from Shin-Etsu), trifluoropropyltrimethoxysilane (KBM7103, available from Shin-Etsu), heptadecafluorodecyltrimethoxysilane (KBM7803, available from Shin-Etsu), isocyanatopropyltriethoxysilane (KBE9007, available from Shin-Etsu), aminopropyltriethoxysilane (KBE903, available from Shin-Etsu), aminoethylaminopropyltriethoxysilane (KBE603, available from Shin-Etsu), alkyltrimethoxysilane (DOW HV 10, available from Dow Corning), and a coating having trifluoropropyl trimethoxysilane, vinylmethoxysilane, tetra(2-methoxyethoxy)silane (DOW 4040 Prime Coat, available from Dow Corning), mixtures thereof, and the like. Suitable silane promoters can further include those sold by GE Silicones of Wilton, Conn. under the Silquest®, CoatO-Sil®, NXT®, XL-Pearl™ and Silcat® trademarks. Examples include the following product numbers, sold under the Silquest® trademark: A1101, A1102, A1126, A1128, A1130, A1230, A1310, A162, A174, A178, A187, A2120. For example, Silquest® A-2120 is an adhesion promoter of N(beta-aminoethyl) gamma-aminopropylmethyldimethoxysilane.

In various embodiments, the "silane promoter" can be an adhesion promoter used to enable hot-melt bookbinding adhesives for use on fuser oil contaminated iGen3 prints, additional information of the silane promoter can be found in co-pending U.S. patent application Ser. No. 11/623,640, filed Jan. 16, 2007, and entitled "Adhesion Promoter", the disclosure of which is incorporated herein by reference in its entirety.

The silane promoter can be used to improve the compatibility of the pressure sensitive compound, even when the pressure sensitive compound is contaminated by the functionalized PDMS fuser oil received from an iGen3 fuser or other fuser during printing. In Various embodiments, the silane promoter can be mixed with (e.g., added into) the pressure sensitive compound formulation to form the disclosed pressure-seal cohesive, wherein the silane promoter can be mixed at levels of about 0.5% to about 2.5% of a total mass basis of the pressure-seal cohesive. In some embodiments, the admixed silane promoter can be added directly to the pressure sensitive compound formulation. In other embodiments, the silane compound can be formed in an aqueous buffer solution prior to mixing with the pressure sensitive compound (formulation).

In various embodiments, the silane promoter can promote cohesion of the pressure sensitive compound to form the pressure-seal cohesive, regardless if the pressure-seal cohesive has fuser oil thereon, or if the pressure-seal cohesive is at least partially covered by fuser oil. A cohesive bond can be established between a portion of the silane-promoter-admixed pressure sensitive compound and its mating portion when sealing after the printing process.

The "pressure sensitive compound formulation" can include one or more pressure sensitive compounds using an aqueous emulsion based chemistry designed to seal against itself under pressures applied at ambient temperatures.

The "pressure sensitive compound" can include conventional pressure sensitive compounds such as conventional pressure sensitive adhesives and/or cohesives known to one of ordinary skill in the related arts. The conventional pressure sensitive compound can include, but is not limited to, alkylacrylate polymers and copolymers; copolymers of alkylacrylates with acrylic acid; terpolymers of alkylacrylates, acrylic acid, and vinyl-lactates; alkyl vinyl ether polymers and copolymers; polyisoalkylenes; polyalkyldienes; alkyldienestyrene copolymers; styrene-isoprene-styrene block copolymers; polydialkylsiloxanes; polyalkylphenylsiloxanes; natural rubbers; synthetic rubbers; chlorinated rubbers; latex crepe; rosin; cumarone resins; alkyd polymers; and polyacrylate esters and mixtures thereof. Examples can also include, but are not limited to, polyisobutylenes, polybutadienes, or butadiene-styrene copolymers, and mixtures thereof; silicone-based compounds such as polydimethylsiloxane, and polymethylphenylsiloxane combined with other resins and/or oils. Other suitable "pressure sensitive compound" can include tackified thermoplastic resins and tackified thermoplastic elastomers, wherein the tackifier can include one or more compounds which increases the tack of the composition.

In an exemplary embodiment, the "pressure sensitive compound" can include the pressure sensitive material containing a natural rubber latex modified by copolymerization with various acrylate monomers that can be combined with levels of pigment particles such as silica gel and can also contain some level of other latex as well as starch, as described in the related U.S. Pat. No. 6,602,944, entitled "Pressure Sensitive Cohesive," which is hereby incorporated by reference in its entirety. The exemplary pressure sensitive cohesive can include 100 parts by weight natural rubber (e.g. electrosterically stabilized natural rubber graft and block terpolymer), and, expressed as percentages by weight of the rubber, the following components: about 5-35% (e.g. about 28%) acrylate monomer or monomers (such as methyl methacrylate, cyclohexyl methacrylate, benzyl methacrylate, and/or isobornyl methacrylate); about 0.5-8% acrylic acid and/or about 1-10% 4-acetoxystyrene; about 0-20% ethyl hexyl acrylate; about 1-50% (e.g. about 10-30%) finely divided hard particulate material (such as silica gel); 0-50% (preferably about 10-30%) starch; and 0-40% (preferably at least about 5%) carboxylated styrene-butadiene latex, or carboxylated polychloroprene latex, or a styrene-acrylate-acrylonitrile latex, or vinyl-pyridine styrene-butadiene latex, or pre-crosslinked natural rubber latex, or a tackifier, or combinations thereof.

The disclosed pressure-seal cohesive, including a mixture of the silane promoter(s) and the pressure sensitive compound (s), can have a variety of applications including, but not limited to, pressure-seal mailers, product sheets, brochures, presentation folders, informational sheets, stationery and combinations thereof, although the term "mailers" or "mailer type business form" is referred to throughout the description herein for illustrative purposes.

Figure 1:
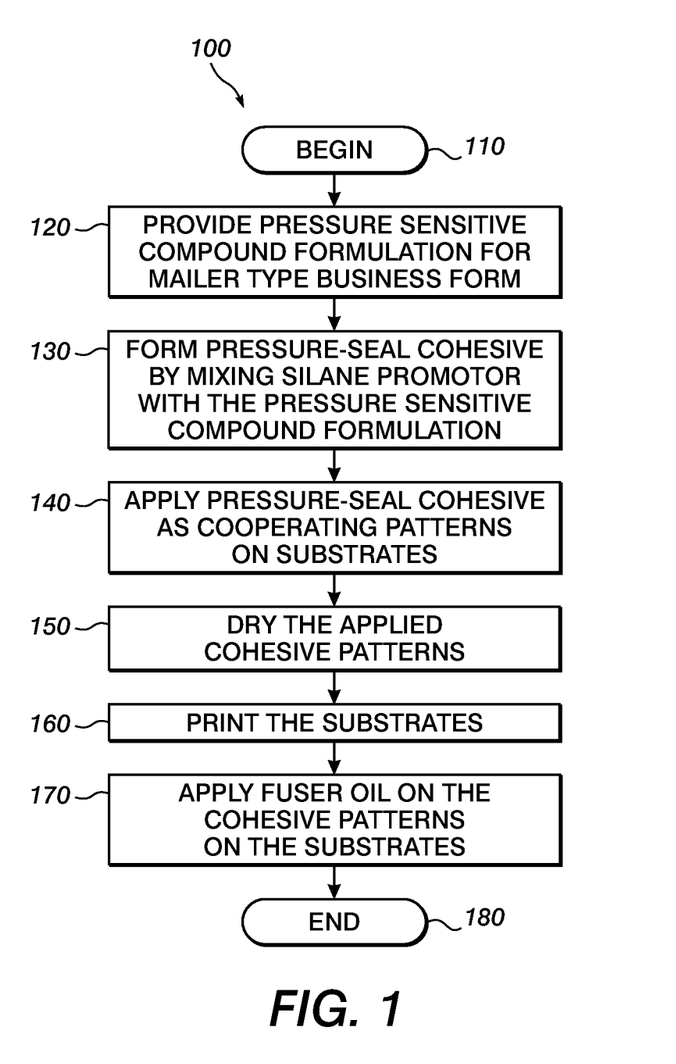
FIG. 1 depicts an exemplary method of making a mailer type business form using the disclosed pressure-seal cohesive in accordance with the present teachings.

FIG. 1 depicts an exemplary method 100 of making a mailer type business form using the disclosed pressure-seal cohesive in accordance with the present teachings. While the exemplary method 100 is illustrated and described below as a series of acts or events, it will be appreciated that the present invention is not limited by the illustrated ordering of such acts or events. For example, some acts may occur in different orders and/or concurrently with other acts or events apart from those illustrated and/or described herein in accordance with the present teachings. In addition, not all illustrated steps may be required to implement a methodology in accordance with the present teachings.

The method 100 begins at 110. At 120, a pressure sensitive compound formulation can be provided. The pressure sensitive compound formulation can be, for example, a conventional pressure-seal cohesive formulation as described in U.S. Pat. No. 6,602,944, which is noted as lacking adequate cohesive bonding properties after being contaminated by a functionalized PDMS fuser oil from, e.g., Xerox iGen3 printing.

At 130, the disclosed pressure-seal cohesive can be formed by mixing a silane promoter, such as an amino-functionalized silane adhesion promoter, with the provided pressure sensitive compound formulation, where a simple mixing operation can be used to uniformly blend the two materials. In various embodiments, the mixing operation can be performed as a batch operation using a low shear agitator or can be performed continuously using, for example, an in-line static mixer. As disclosed, the silane promoter can include a mass fraction ranging from about 0.5 to 2.5 parts over the total 100 parts of the pressure-seal cohesive by mass.

At 140, the formed pressure-seal cohesive can be applied on substrates as cooperating patterns. The substrate can be, for example, a paper sheet from a paper stock to eventually form a mailer type business form. The paper stock can include, for example, a laser bond stock, a check stock or any other desired paper stock. The application of the pressure-seal cohesive can be performed using a variety of techniques in practice including, but not limited to, coating, depositing, or printing. In various embodiments, rod coating, various roll coater configurations, anilox-flexo or offset gravure, and others can be used.

Alternatively, the formation and application of the pressure-seal cohesive at 130 and 140 can be performed by, first applying patterned pressure sensitive adhesives/cohesives on a desired paper web followed by the application of the silane promoters on top of the applied patterned pressure sensitive adhesives/cohesives to form the pressure-seal cohesive. In this manner, the pressure-seal cohesive can also include the silane promoter(s), and pressure sensitive compound(s), wherein the silane promoter has a mass fraction ranging from about 0.5 to about 2.5 parts over the total 100 parts of the pressure-seal cohesive by mass.

The cooperating patterns of the pressure-seal cohesive can be predetermined on one or both sides of the exemplary paper sheet/web depending on the desired type of business form. Each cooperating pattern can have a matching (mating) pattern to be placed in contact with each other during the subsequent sealing process. The cooperating patterns can be arranged, e.g., in arrays with certain geometries or distributions of each array, according to specific applications. In addition, the cooperating patterns can be formed using the same geometric shape, or using a variety of different geometric shapes for use on a single mailer form. The geometric shapes can include, but are not limited to, rectangles, triangles, squares, circles, and strips (e.g., long and narrow). Further, the cooperating patterns can have a uniform thickness or various different thicknesses on a single pressure seal mailer form. For example, some of the cooperating patterns can have one geometric shape and/or one thickness, and others can have another one or more different geometric shapes and/or thicknesses. In various embodiments, the mailer type business form can have offset pre-printing and some patterns of scoring and perforation in addition to the cooperating patterns of the pressure-seal cohesive.

At 150, a drying process can be performed, following the application of the pressure-seal cohesive on the mailer type business forms. In an exemplary embodiment, the pressure-seal cohesive can be applied to laser bond stock by a converter (e.g., a meyer rod or an anlox flexo) in a coating operation, and further dried using a variety of methods, such as, for example, a radiant drying, a convection drying, a RF (radio frequency) drying, among others.

At 160, the dried paper sheet/mailer form can then be introduced as a substrate for printing of variable data (standard or individualized information), e.g., on a digital printable machine such as an iGen3 xerographic or dry toner printer. As used herein, the term "digital printable" refers to printable by a digital printing method including, laser, inkjet, thermal mass transfer, thermal dye transfer, electrostatic, ion deposition, electron beam imaging, solid ink-Jet and dot-matrix printings. The printing can employ black and/or colored printing media (e.g. liquid ink, ribbon, or toner powder).

At 170, in the fusing stage of xerographic digital printing, the cooperating patterns of the pressure-seal cohesive can run through, e.g., an iGen3 fuser, and receive a film of fuser oil thereon. For example, the printed substrate (e.g., the mailer type business form) can receive about 4 to about 20 mg amino-functionalized PDMS oil during iGen3 fusing operation for an exemplary 8.5×11 inch paper sheet. As disclosed, the fuser oil contaminated pressure-seal cohesive can provide an acceptable cohesive bond due to the addition of the silane promoter(s) to the pressure sensitive compound(s).

To complete the mailer formation, following the printing process, the forms can be detached from the paper sheet/web when exiting the printer and folded to produce mailers. The mailer forms can be folded to move the matched cooperating patterns of the pressure-seal cohesive into contact for the subsequent sealing. Alternatively, the cooperating patterns can move into contact with each other from a like-coated second paper sheet that contacts with the paper sheet.

A sealing pressure can then be applied to the folded mailer type business forms in the area corresponding to the location of the joined cooperating patterns. For example, the folded mailers can be passed through a pressure sealer to activate the pressure-seal cohesive (e.g., the fuser oil contaminated pressure-seal cohesive) and seal the edges of the forms to form a completed mailer product. In various embodiments, the folding process and the pressure sealing process can be performed using customized converting equipment that is in-line or off-line with respect to the digital printing at 160. The pressure seal industry can supply a number of these devices, such as PS-4 Speedisealer (®) from Moore North America. The method 100 can conclude at 180.

EXAMPLES

The following examples are illustrative of the invention and its advantageous properties, and are not to be taken as limiting the disclosure or claims in any way. In this example, as well as elsewhere in this application, all parts and percentages are by weight unless otherwise indicated.

An exemplary method of the present application was performed using Xerox printing technology. A pressure-seal cohesive was formed by mixing an exemplary pressure sensitive compound formulation and an exemplary silane promoter (e.g., Silquest A 2120). The pressure-seal cohesive was then coated on 90 gsm Xerox Color Expressions Plus paper using a Meyer rod and/or dried for a time length of about 90 s at a temperature of about 80° C. in a Mathis lab dryer. The pressure-seal cohesive coated paper sheet was then run through a Xerox iGen3 fuser, that was operated with, e.g., Xerox Fuser Fluids having amino-functional PDMS release oils designed for Xerox iGen3, after first stabilizing the release agent metering system by running 50 sheets of standard 75 gsm Xerographic bond. The paper sheet was then folded in half (i.e., bi-fold) or in any desired format (e.g., tri-fold) to place one pattern of the coated pressure-seal cohesive in contact with its mating pattern, followed by a sealing process using, for example, a 2-roll steel lab calendar with pressure adjusted to be equivalent to commercial pressure seal units to seal the sheets.

The bonding strength of the fuser oil contaminated pressure-seal cohesive (i.e., having both the pressure sensitive compounds and the silane promoters) was measured using a peel test known to one of ordinary skill, where a satisfactory cohesive bond can be indicated by high percentage of fiber tear during a peel test. The satisfactory cohesive bond means the bond and/or strength of the paper substrate (e.g., cohesive/adhesive bond or the paper cohesive strength) fails before the failure of the pressure-seal cohesives' cohesive bond, and that this desired state can be indicated by "fiber tear". In this example, the peel test was performed after the sealing process using the calendar nip pressure to measure the fiber tear when attempted to pull the joined pressure-seal cohesive apart.

A calendar nip pressure was adjusted, so that a strong bond strength having 100% fiber tear was achieved for a control bond. The control bond included only the pressure sensitive compound, wherein no fuser step was performed (i.e., no fuser oil contamination on the control sample) and no silane promoter was added to the pressure sensitive compound. Note that, as known in the art, when there is no promoter added to a pressure sensitive compound but with a fuser step performed, the folded paper can lose bonding strength and be re-opened without fiber tear after passing through the calendar nip due to the fuser oil contamination.

Figure 2A:
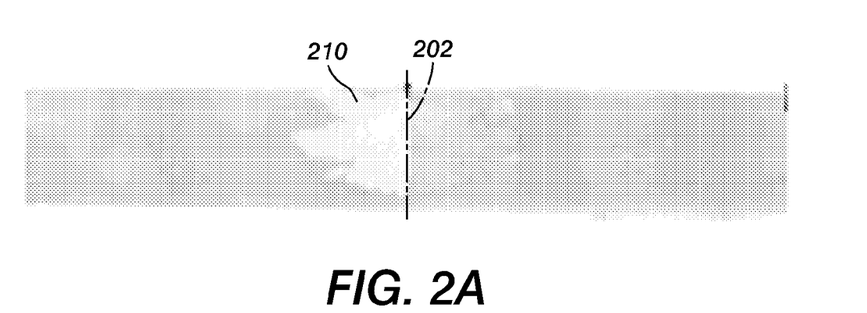
FIGS. 2A-2C depict a set of exemplary peel test results for the bonded pressure-seal cohesive in accordance with the present teachings.
Figure 2B:
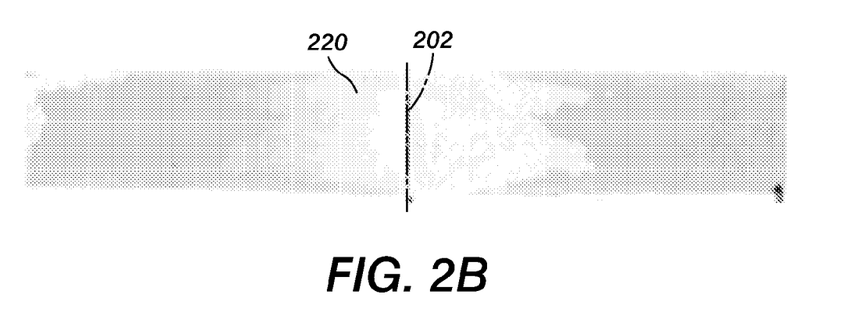
Figure 2C:
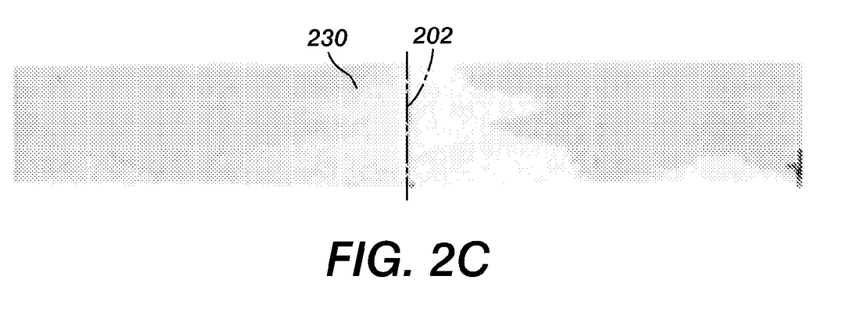
Figure 3A:
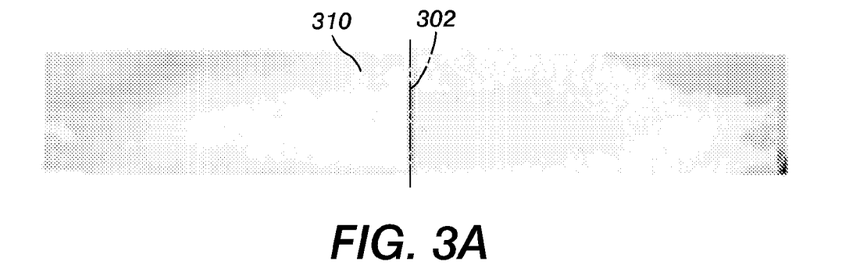
FIGS. 3A-3C depict another set of exemplary peel test results for the bonded pressure-seal cohesive in accordance with the present teachings.
Figure 3B:
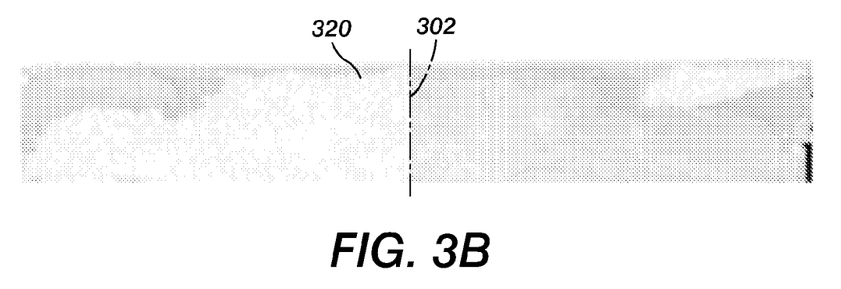
Figure 3C:
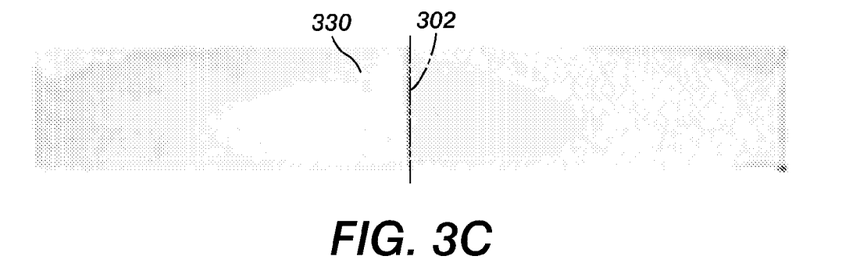

A peel test was performed after the mailer form had exited the printing fuser for about 1 hour (results are shown in FIGS. 2A-2C) or for about 24 hours (results are shown in FIGS. 3A-3C).

The concentration of silane promoter used for the pressure-seal cohesive was varied to have a mass concentration of silane promoter of about 1.5% (see FIGS. 2A, and 3A), about 2.0% (see FIGS. 2B, and 3B), and about 2.5% (see FIGS. 2C, and 3C), based on the total mass of the pressure-seal cohesive. In addition, each sample in FIGS. 2A-2C and FIGS. 3A-3C included a folding line 202 and 302, respectively, indicating the mailer forms were folded according to lines 202 or 302 and then pressure-sealed. Further, each sample included a fiber tear area shown as 210, 220, and 230 in FIGS. 2A-2C, and shown as 310, 320 and 330 in FIGS. 3A-3C, generated due to the cohesive bond of the disclosed pressure-seal cohesive when "peeling". Specifically, as shown in FIGS. 2A-2C, wherein the bonding strength is measured one hour after printing, the fiber tear was about 20.8%, 25% and 25% for the pressure seal cohesives having mass concentrations of silane promoter of about 1.5%, 2.0% and 2.5%, respectively. While as shown in FIGS. 3A-3C, the bonding strength is measured 24 hours after printing, the fiber tear was about 80%, 75% and 90% for the pressure seal cohesives having mass concentrations of silane promoter of about 1.5%, 2.0% and 2.5%, respectively. These fiber tear results (as also summarized in table 1) show a desirable bonding strength was achieved for the fuser oil contaminated pressure-seal cohesive on the mailer type business form due to the addition of the silane promoter.

TABLE 1

| Reference | Promoter level (%) | Time before peel test (hr) | Fiber tear (%) |
|---|---|---|---|
| 2A | 1.5 | 1 | 20 |
| 2B | 2 | 1 | 25 |
| 2C | 2.5 | 1 | 25 |
| 3A | 1.5 | 24 | 80 |
| 3B | 2 | 24 | 75 |
| 3C | 2.5 | 24 | 90 |

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:
1. A mailer form comprising:
(a) a plurality of patterns of a pressure-seal cohesive disposed on the mailer form for cohesively sealing the mailer form,
(b) a fuser oil contamination covering at least a part of the plurality of patterns of the pressure-seal cohesive, wherein the fuser oil is amino functionalized polydimethylsiloxane, and
(c) a cohesive seal comprising the pressure-seal cohesive and fuser oil contamination,
wherein the pressure-seal cohesive comprises (a) about 1.5 weight percent to about 2.5 weight percent of a silane promoter, based on the total mass of the pressure seal cohesive, and (b) at least one pressure sensitive compound comprising a synthetic rubber, and the silane promoter is incorporated with the at least one pressure sensitive compound;
wherein the silane promoter is N-(2-aminoethyl)-3-aminopropylmethyldimethoxysilane and
wherein the silane promoter is present in an amount sufficient to promote cohesion of the pressure-seal cohesive in the presence of the fuser oil so that the fiber tear bonding strength is at least about 20.8% one hour after the cohesive seal is formed and at least about 75% 24 hours after the cohesive seal is formed.

2. The mailer form of claim 1, wherein the mailer form comprises one or more forms selected from the group consisting of product sheets, brochures, presentation folders, informational sheets, and stationery.

3. The mailer form of claim 1, wherein the pressure-seal cohesive comprises about 2.0 weight percent to about 2.5 weight percent silane promoter.

4. The mailer form of claim 1, wherein the pressure-seal cohesive further comprises an aqueous emulsion for the pressure sensitive compound or the silane promoter.

5. The mailer form of claim 1, wherein the at least one pressure sensitive compound is chosen from pressure sensitive adhesives and pressure sensitive cohesives.

6. A mailer form comprising:
(a) a plurality of patterns of a pressure-seal cohesive disposed on the mailer form for cohesively sealing the mailer form,
(b) a fuser oil contamination covering at least a part of the plurality of patterns of the pressure-seal cohesive, wherein the fuser oil is amino functionalized polydimethylsiloxane, and
(c) a cohesive seal comprising the pressure-seal cohesive and fuser oil contamination,
wherein the pressure-seal cohesive comprises (a) about 1.5 weight percent to about 2.5 weight percent of a silane promoter, based on the total mass of the pressure seal cohesive, and (b) at least one pressure sensitive compound comprising a synthetic rubber, and the silane promoter is incorporated with the at least one pressure sensitive compound;
wherein the silane promoter comprises at least one silane compound selected from the group consisting of N-(2-aminoethyl)-3-aminopropylmethyldimethoxysilane, N-(2-aminoethyl)-3-aminopropylethyldiethoxysilane, 4-Aminobutyltriethoxysilane, 1-Amino-2-(Dimethylethoxysilyl)propane, N-(2-aminoethyl)-3-aminoisobutyldimethylmethoxysilane, N-(2-aminoethyl)-3-aminoisobutyldimethylmethoxysilane, (aminoethylaminomethyl)phenethyltrimethoxysilane, N-(2-aminoethyl)-3-aminopropylsilanetriol, N-(6-aminohexyl)aminomethyl-trimethoxysilane, N-(6-aminohexyl)aminopropyl-trimethoxysilane, N-(2-aminoethyl)-11-aminoundecyl-trimethoxysilane, 3-aminopropylmethylbis(trimethylsiloxy)silane, 3-aminopropyldimethylethoxysilane, 3-aminopropyltris(methoxyethoxyethoxy)silane, and (3-trimethoxysilylpropyl)diethylene-triamine; and
wherein the silane promoter is present in amount sufficient to promote cohesion of the pressure-seal cohesive in the presence of the fuser oil.

7. The mailer form of claim 6, wherein the silane promoter comprises at least one silane compound selected from the group consisting of N-(2-aminoethyl)-3-aminopropylmethyldimethoxysilane and N-(2-aminoethyl)-3-aminopropylethyldiethoxysilane.

8. The mailer form of claim 6, wherein the mailer form comprises one or more forms selected from the group consisting of product sheets, brochures, presentation folders, informational sheets, and stationery.

9. The mailer form of claim 6, wherein the pressure-seal cohesive comprises about 2.0 weight percent to about 2.5 weight percent silane promoter.

10. The mailer form of claim 6, wherein the pressure-seal cohesive further comprises an aqueous emulsion for the pressure sensitive compound or the silane promoter.

11. The mailer form of claim 6, wherein the at least one pressure sensitive compound is chosen from pressure sensitive adhesives and pressure sensitive cohesives.

* * * * *